No. 778,461. PATENTED DEC. 27, 1904.
L. J. ROBB.
FEEDER FOR BELT CONVEYERS.
APPLICATION FILED AUG. 4, 1904.
2 SHEETS—SHEET 1.
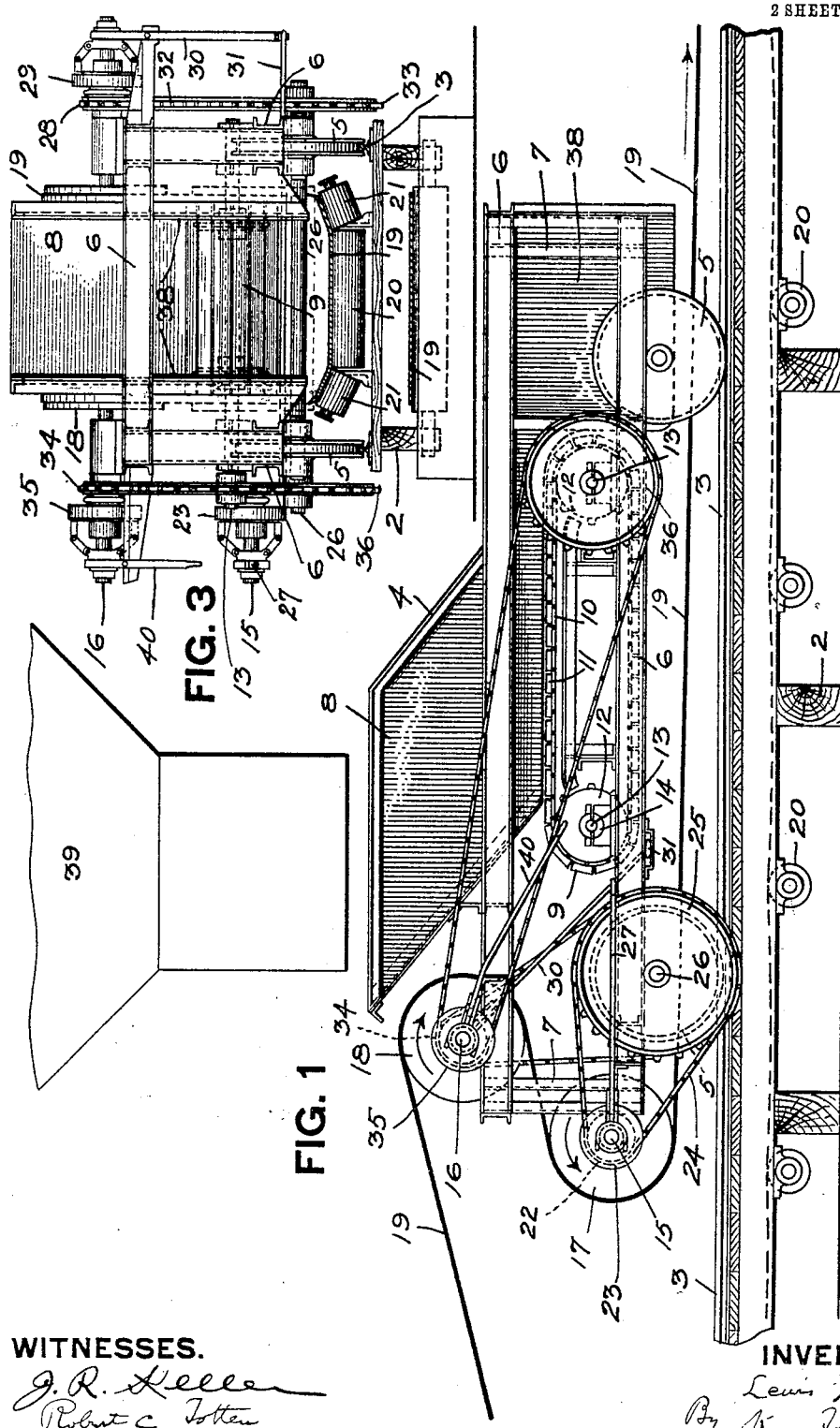
WITNESSES.
INVENTOR.

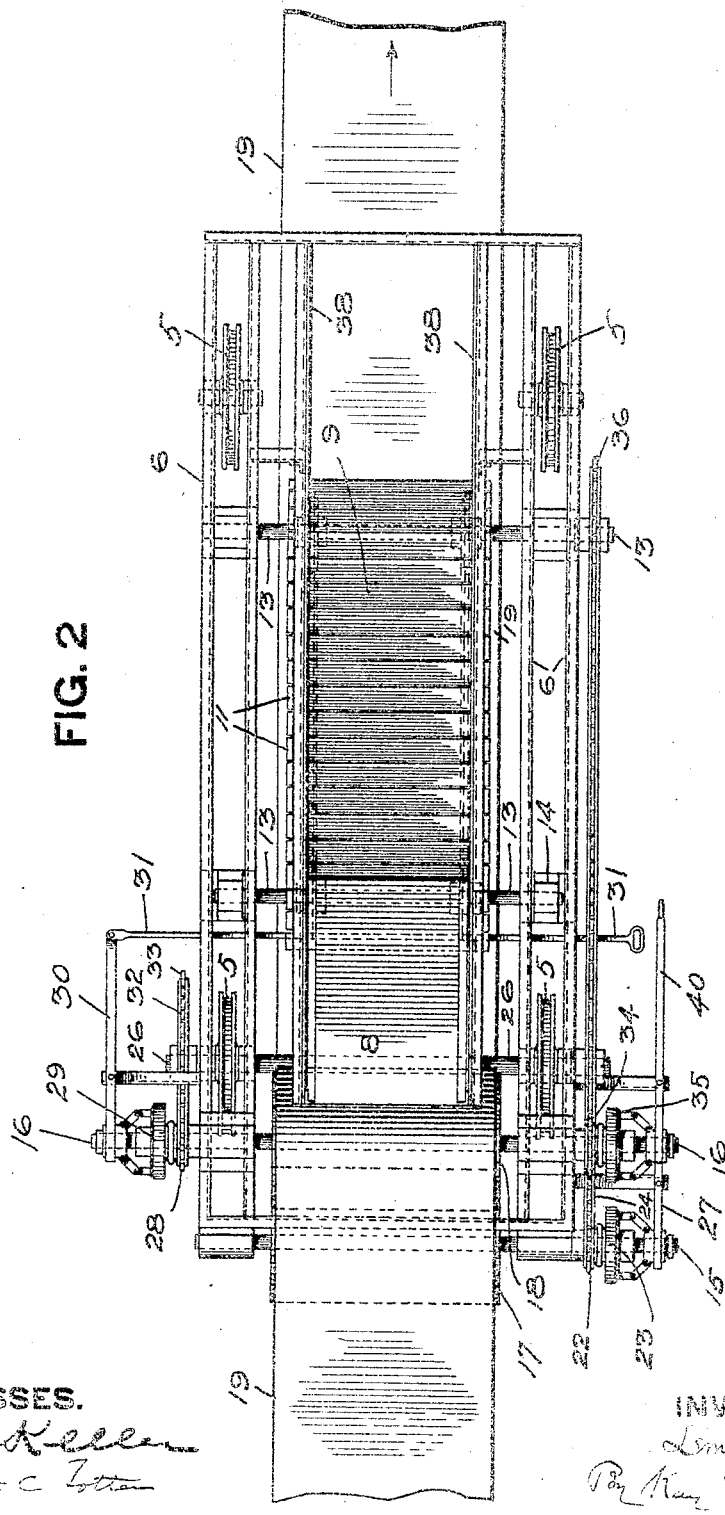

No. 778,461.                                         Patented December 27, 1904.

UNITED STATES PATENT OFFICE.

LEWIS J. ROBB, OF PITTSBURG, PENNSYLVANIA, ASSIGNOR TO HEYL AND PATTERSON, INC., OF PITTSBURG, PENNSYLVANIA, A CORPORATION OF PENNSYLVANIA.

FEEDER FOR BELT CONVEYERS.

SPECIFICATION forming part of Letters Patent No. 778,461, dated December 27, 1904.

Application filed August 4, 1904. Serial No. 219,465.

*To all whom it may concern:*

Be it known that I, LEWIS J. ROBB, a resident of Pittsburg, in the county of Allegheny and State of Pennsylvania, have invented a new and useful Improvement in Feeders for Belt Conveyers; and I do hereby declare the following to be a full, clear, and exact description thereof.

My invention relates to a feeder for belt conveyers, its object being to provide a portable device which may be moved along in position to receive material from different bins along the route of the conveyer, the power to operate the feeder being taken directly from the belt of the conveyer.

To these ends my invention comprises, generally stated, a feeder for a belt conveyer, comprising a carriage adapted to receive the material from a suitable hopper or bin, with means for discharging the material onto the belt conveyer and means for moving the feeder in either direction by power received from the conveyer itself.

To enable others skilled in the art to make and use my invention, I will describe the same more fully, referring to the accompanying drawings, in which—

Figure 1 is a side elevation of my improved feeder in position to receive the material from the bin. Fig. 2 is a plan view thereof, and Fig. 3 is an end view showing the belt conveyer in section.

Like numerals indicate like parts in each of the figures.

In the drawings the numeral 2 designates a suitable platform or structure upon which are laid the rails 3. Supported by the rails 3 and adapted to travel back and forth thereon is the feeder 4, which is mounted on the wheels 5, adapted to run on the track 3. The feeder 4 may be of any suitable construction, that shown being formed of channel-beams 6, connected by the angles 7, which form the framework to support the hopper 8. Below the hopper 8 is the conveyer 9, which is made up of the chains 10 and the slats 11 connected thereto. These chains 10 pass around suitable sprocket-wheels 12, mounted on the shafts 13, journaled in suitable bearings 14 in the frame of the feeder. Mounted in suitable bearings in the frame of the feeder are the shafts 15 and 16, and upon these shafts are mounted the drums 17 and 18, respectively. The belt conveyer 19 passes around these pulleys 17 and 18 and thence on in under the feeder to any desired point beyond, said belt conveyer being of the ordinary construction and being supported by the center rollers 20 and the side angular rollers 21 in order to cause the belt to assume a position to form a kind of trough to hold the material deposited thereinto. This belt conveyer 19 is driven by suitable power mechanism and travels in the direction of the arrow, Fig. 1. This acts to drive the pulleys 17 and 18 in opposite directions, as indicated by the arrows.

Mounted on the shaft 15 is the sprocket-wheel 22, loosely mounted on said shaft, and a suitable clutch mechanism 23 on said shaft 15 is adapted to be thrown into engagement with the sprocket-wheel 22 so as to cause the said sprocket-wheel to rotate with the said shaft 15. A chain 24 connects the sprocket-wheel 22 with the sprocket-wheel 25 on the axle 26. In this manner power is transmitted from the shaft 15 to the axle 26, and thereby power is imparted to drive the wheels 5 of the feeder along the track 3. The clutch 23 is operated by the lever 27.

Loosely mounted on the shaft 16 is the sprocket-wheel 28 and clutch mechanism 29, adapted to be thrown into engagement with said sprocket-wheel to drive the same by means of the arm 30 and lever 31, which extends through to the same side of the machine as the lever 27, which operates the clutch 23. A chain 32 connects the sprocket-wheel 28 with the sprocket-wheel 33 on the axle 26. It is apparent from the above that by operating alternately the levers 27 and 31 the direction of the travel of the feeder along the track 3 may be varied at will. Loosely mounted on the opposite end of the shaft 16 is the sprocket-wheel 34 with clutch mechanism 35 for throwing said sprocket-wheel 34 into engagement with the sprocket-wheel 36 on one of the shafts 13 of the conveyer 9. In this manner power is transmitted from the shaft 16 to drive the conveyer 9. The clutch 35 is operated by lever 40.

The forward end of the feeder 4 has the depending sides 38, which act to direct the material discharged from the conveyer 9 onto the belt conveyer 19.

The numeral 39 designates a suitable hopper or chute leading from the bin containing the coal, grain, or any other material to be conveyed. There will be a series of such chutes arranged at intervals along the route of the belt conveyer.

When my improved feeder is in operation, by operating the proper lever 27 or 31 the power is transmitted from the belt conveyer 19 to the wheels 5 of the feeder and the feeder is propelled along the track 3 until it is brought into proper position with reference to the chute or bin 39. When in this position, the lever is reversed and the feeder is brought to a standstill. The lever 40 is then operated so as to throw the clutch 35 into engagement with the sprocket-wheel 34, whereupon through the chain 36 power is transmitted to drive the conveyer 9. The material is then discharged from the bin 39 into the hopper 8 of the feeder, whence it passes down onto the conveyer 9, which carries it forward and discharges it onto the belt conveyer 19, whence it is conveyed on to the point of discharge. This is continued until the proper quantity of material has been drawn from the bin 39, when the lever 40 is again operated to throw out the clutch 35 and stop the travel of the belt 9. The operator then operates one of the levers 27 or 31, according to the direction to be given to the feeder, whereupon the feeder is driven in that direction by the power transmitted from the belt conveyer itself. The feeder is accordingly moved on to the next bin to be tapped, when it is brought to a standstill and the material conveyed by the feeder onto the belt conveyer.

By my invention I have provided a simple form of feeder by means of which the material is discharged in even quantities upon the belt conveyer, while at the same time no extra power is required to operate the feeder, as the movement of the belt conveyer itself furnishes all the power necessary to operate the feeder. The feeder is easily controlled and brought accurately in position with reference to the different bins, while at the same time its direction of travel is readily reversed, so as to make it possible to tap from any bin of the series.

What I claim is—

1. In a feeder for belt conveyers, the combination of the carriage adapted to receive the material, means for discharging the material from said carriage upon the belt conveyer, and means for driving the carriage to any desired point along said belt conveyer by power transmitted from said belt conveyer.

2. In a feeder for belt conveyer, the combination of a suitable carriage adapted to receive the material to be conveyed, means for discharging the material from said carriage to the belt conveyer, means for propelling said carriage to any desired point along said belt conveyer by power transmitted from said belt conveyer, and means for reversing the direction of travel of said carriage.

3. In a feeder for belt conveyer, the combination of a suitable carriage adapted to receive the material, mechanism for propelling said carriage to any desired point along said belt conveyer, a conveyer on said carriage adapted to discharge the material onto the belt conveyer, and means for driving said conveyer by power transmitted from said belt conveyer.

4. In a feeder for a belt conveyer, the combination of a suitable carriage, a conveyer on said carriage adapted to discharge the material onto the belt conveyer, and means for driving said carriage to any desired point along said belt conveyer.

5. In a feeder for belt conveyer, the combination of a suitable carriage adapted to receive the material, a conveyer on said carriage adapted to discharge the material onto the belt conveyer, means for driving said conveyer by power transmitted from said belt conveyer, and means for operating said carriage by power transmitted from said belt conveyer.

6. In a feeder for belt conveyer, the combination with a suitable carriage adapted to receive the material to be conveyed, of pulleys mounted on said carriage, the belt conveyer engaging said pulleys to drive the same in opposite directions, and connections between the said pulleys and operating mechanism for driving said carriage.

7. In a feeder for belt conveyer, the combination of a suitable carriage, shafts on said carriage, means for driving said shafts in opposite directions by power transmitted from the belt conveyer, and connections between said shafts and mechanism for driving said carriage.

8. In a feeder for belt conveyer, the combination of a carriage, comprising a suitable receiving chute or hopper and conveyer arranged beneath said hopper adapted to discharge the material onto the belt conveyer, means for driving said conveyer by power transmitted from said belt conveyer, and means for operating said carriage by power transmitted from said belt conveyer.

In testimony whereof I, the said LEWIS J. ROBB, have hereunto set my hand.

LEWIS J. ROBB.

Witnesses:
ROBERT C. TOTTEN,
JOHN R. KELLER.